US009976807B2

(12) United States Patent
Weber et al.

(10) Patent No.: US 9,976,807 B2
(45) Date of Patent: May 22, 2018

(54) DEVICE FOR HEAT TREATMENT

(71) Applicant: Heraeus Noblelight GmbH, Hanau (DE)

(72) Inventors: Jürgen Weber, Kleinostheim (DE); Frank Diehl, Bad Homburg (DE); Sven Linow, Darmstadt (DE)

(73) Assignee: Heraeus Noblelight GmbH, Hanau (DE)

( * ) Notice: Subject to any disclaimer, the term of this patent is extended or adjusted under 35 U.S.C. 154(b) by 738 days.

(21) Appl. No.: 14/379,127

(22) PCT Filed: Jan. 12, 2013

(86) PCT No.: PCT/EP2013/000074
§ 371 (c)(1),
(2) Date: Aug. 15, 2014

(87) PCT Pub. No.: WO2013/120571
PCT Pub. Date: Aug. 22, 2013

(65) Prior Publication Data

US 2015/0010294 A1 Jan. 8, 2015

(30) Foreign Application Priority Data

Feb. 17, 2012 (DE) ........................ 10 2012 003 030

(51) Int. Cl.
*A21B 2/00* (2006.01)
*F27D 1/00* (2006.01)
(Continued)

(52) U.S. Cl.
CPC ............. *F27D 1/00* (2013.01); *F27D 1/0006* (2013.01); *H05B 3/62* (2013.01); *H05B 6/00* (2013.01)

(58) Field of Classification Search
CPC .......... F27D 1/00; F27D 1/0006; H05B 3/62; H05B 6/00
(Continued)

(56) References Cited

U.S. PATENT DOCUMENTS 4,091,793 A 5/1978 Hermann et al.
4,883,424 A 11/1989 Sakai et al.
(Continued)

FOREIGN PATENT DOCUMENTS

AT 157690 B 1/1940
DE 1973753 U 11/1967
(Continued)

OTHER PUBLICATIONS

English translation of Office Action dated Dec. 16, 2015 in KR Application No. 1020147022753.
(Continued)

*Primary Examiner* — Dana Ross
*Assistant Examiner* — Joseph Iskra
(74) *Attorney, Agent, or Firm* — Panitch Schwarze Bellisario & Nadel LLP

(57) ABSTRACT

Known devices for heat treatment comprise a process space surrounded by a furnace lining made of quartz glass, a heating facility, and a reflector. In order to provide, on this basis, a device for heat treatment having a furnace lining that can be manufactured easily and in variable shapes and enables rapid heating and cooling of the material to be heated and short process times and is characterized by its long service life, the invention proposes that the furnace lining comprises multiple wall elements having a side facing the process space and a side facing away from the process space, and that at least one of the wall elements comprises multiple quartz glass tubes that are connected to each other by means of an $SiO_2$-containing connecting mass.

15 Claims, 3 Drawing Sheets

(51) Int. Cl.

| | |
|---|---|
| ***H05B 3/62*** | (2006.01) |
| ***H05B 6/00*** | (2006.01) |

(58) Field of Classification Search

USPC ................ 392/416; 219/390, 399, 406, 408; 373/111, 119, 127; 433/32

See application file for complete search history.

(56) References Cited

U.S. PATENT DOCUMENTS

| | | | | |
|---|---|---|---|---|
| 2006/0038470 | A1* | 2/2006 | Maul | C03C 17/005 313/113 |
| 2006/0046075 | A1* | 3/2006 | Maul | C03B 19/06 428/432 |
| 2007/0062928 | A1* | 3/2007 | Hauner | F27B 5/14 219/408 |

FOREIGN PATENT DOCUMENTS

| | | | |
|---|---|---|---|
| DE | 2522160 | A1 | 11/1976 |
| DE | 2934106 | A1 | 3/1981 |
| DE | 19756868 | A1 | 8/1998 |
| DE | 102004054392 | A1 | 3/2006 |
| GB | 2057083 | A | 3/1981 |
| GB | 2321972 | A | 8/1998 |
| JP | S5917587 | U | 2/1984 |
| JP | 2006515053 | A | 5/2006 |
| JP | 2006138141 | A | 6/2006 |
| JP | 2010199186 | A | 9/2010 |
| WO | 2004001311 | A1 | 12/2003 |

OTHER PUBLICATIONS

Int’l Preliminary Report on Patentability dated Aug. 28, 2014 in Int’l Application No. PCT/EP2013/000074.

English translation of Office Action dated Jul. 26, 2016 in KR Application No. 1020147022753.

Int’l Search Report and Written Opinion dated Jun. 4, 2013 in Int’l Application No. PCT/EP2013/000074.

Office Action dated Oct. 18, 2012 in DE Application No. 10 2012 003 030.4.

Office Action dated Aug. 31, 2015 in JP Application No. 2014556940.

Office Action dated Jan. 13, 2017 in KR Application No. 10-2014-7022753.

* cited by examiner

DEVICE FOR HEAT TREATMENT

CROSS-REFERENCE TO RELATED APPLICATIONS

This application is a Section 371 of International Application No. PCT/EP2013/000074, filed Jan. 12, 2013, which was published in the German language on Aug. 22, 2013, under International Publication No. WO 2013/120571 A1 and the disclosure of which is incorporated here-in by reference.

BACKGROUND OF THE INVENTION

The invention relates to a device for heat treatment comprising a process space surrounded by a furnace lining made of quartz glass, a heating facility, and a reflector.

Devices of this type are well-suited, in particular, for heating substrates to temperatures above 600° C.

PRIOR ART

Industrial electrical heating furnaces used for heating a material to be heated to temperatures above 600° C. often use infrared radiators emitting short-wave, medium-wave and/or long-wave infrared radiation as heating elements. The infrared radiators are often arranged inside the process space and are thus exposed to high temperatures which causes their service life to be limited.

In order to ensure high process temperatures and low energy losses, said furnaces are provided with an insulating furnace lining, which consists of insulating bricks made of fireclay in many classical furnaces. However, furnace linings made of fireclay have a comparatively high heat capacity. Since the furnace lining needs to be heated first after the furnace is switched on, the high heat capacity of the lining causes the furnace to take relatively long to heat up and to also have a high energy consumption. The use of furnace linings made of fireclay also limits the cleanliness conditions inside the process space. Furnaces having a furnace lining made of fireclay are characterised by their high weight and they are therefore available for mobile use only to a limited degree.

An electrically heated muffle furnace having a furnace lining made of fireclay is known, for example, from DE 1 973 753 U. The muffle furnace comprises, as heating facility, infrared radiators with quartz-surrounded heating coils that are arranged at the ceiling wall of the process space. Arranging the infrared radiator inside the process space is to achieve a short heating time and homogeneous heating of the material to be heated. However, the heating time and the cooling time are prolonged by the furnace lining in this furnace as well.

In order to attain a homogeneous temperature in the process space, the furnace lining needs to first be heated to operating temperature in this case as well. Moreover, furnaces with a furnace lining made of fireclay have a low heat shock resistance such that cracks in the furnace lining may arise if the furnace is opened before time. In order to provide for a long service life of the furnace lining, the furnaces should be opened only after their process space has cooled to a temperature below 400° C.

Aside from fireclay, other refractory materials, usually ceramic products and materials with an operating temperature above 600° C., are used as furnace linings.

Furnace linings made of quartz glass are used for special requirements, such as, for example, processes with high cleanliness requirements. A device for heat treatment of a substrate having a furnace lining made of quartz glass is known, for example, from U.S. Pat. No. 4,883,424. The furnace lining is to enable rapid heating and cooling of the material to be heated; it is designed to be cylindrical in shape and is surrounded by a jacketing that is provided with a reflector for the purpose of cooling. A heating facility made of a Nichrome alloy is arranged inside the furnace lining.

However, furnace linings made of quartz glass are difficult to manufacture, in particular if their dimensions are large. They usually are cylindrical in shape and are therefore suitable only to a limited degree for applications, in which electrical heating furnaces are used.

BRIEF SUMMARY OF THE INVENTION

Technical Object of the Invention

The invention is based on the object to provide a device for heat treatment that has a furnace lining that can be manufactured easily and in variable shape and enables rapid heating and cooling of the material to be heated and short process times, and is characterised by a long service life.

General Description of the Invention

Said objective is met according to the invention based on a device for heat treatment having the features specified above in that the furnace lining comprises multiple wall elements having a side facing the process space and a side facing away from the process space, and in that at least one of the wall elements comprises multiple quartz glass tubes that are connected to each other by means of an $SiO_2$-containing connecting mass.

Compared to known devices having a furnace lining made of quartz glass, the modification according to the invention comprises two essential additional features, namely, firstly, the furnace lining comprises multiple wall elements, and, secondly, at least one of the wall elements comprises multiple quartz glass tubes that are connected to each other by means of an $SiO_2$-containing connecting mass.

Since the furnace lining is made up of multiple wall elements, the furnace lining can be manufactured in variable shape, for example in the shape of a cuboid, a sphere, a cylinder, a pyramid or a cube. The shape of the furnace lining can just as well be adapted to the material to be heated. The individual wall elements are connected to each other such as to be detachable or firmly connected. The connection can be effected, for example, by means of a joined connection, which comprises, for example, purely mechanical form-fit assembly, pressing on or in or gluing the wall elements.

Moreover, the invention provides at least one of the wall elements to comprise multiple quartz glass tubes. Quartz glass tubes are easy and inexpensive to manufacture. Quartz glass tubes comprise a hollow space that contributes to an insulation of the furnace lining; the tubes can be elongated or curved. Due to the quartz glass tubes being connected through a $SiO_2$-containing connecting mass, a wall element that consists essentially of quartz glass is obtained. A wall element of this type has a high temperature resistance. It enables high operating temperatures above 1,000° C.

Compared to a furnace lining made of fireclay, the furnace lining according to the invention is characterised by its low weight and thus a low heat capacity. This provides for rapid heating and cooling of the device. Moreover, the device is characterised by high heat shock resistance such that it can be opened at high temperatures as well. The service life of the device is not adversely affected by frequent, rapid temperature changes. The device according to the invention is well-suited for both batch operation and continuous operation.

In a preferred modification of the device according to the invention, $SiO_2$-containing connecting mass serves both as reflector and as connecting means.

For connecting the quartz glass tubes, an $SiO_2$-containing connecting mass is used that can be applied, for example, as a slurry onto the quartz glass tubes to be connected, and can be dried and sintered, if applicable. Preferably, the $SiO_2$-containing connecting mass forms an opaque, highly diffusely reflecting and porous quartz glass layer that has reflecting properties and therefore also serves as reflector. The connecting mass having reflecting properties allows the device to be operated in an energy-efficient manner. Moreover, the material to be heated can be heated more rapidly due to the reflector layer thus provided such that the process times of batch processes are reduced as well.

It has proven expedient to apply the $SiO_2$-containing connecting mass to the side of the wall element facing the process space.

The $SiO_2$-containing connecting mass has high temperature stability and heat shock resistance. Due to the $SiO_2$-containing connecting mass being applied to the side of the wall element facing the process space, the heat treatment of the material to be heated can be energy-efficient. In this context, attendant losses are minimised and the introduction of heat into the wall elements is reduced such that more of the energy supplied to the process space by the heating facility is available for heat treatment of the material to be heated.

An alternative embodiment provides for applying the $SiO_2$-containing connecting mass to the side of a wall element facing away from the process space.

An $SiO_2$-containing connecting mass that is applied to the side facing away from the process space also leads to a reduction of the attendant energy losses. As the coating is applied to the side of the wall element facing away from the process space, the coating is exposed to lower temperatures and lesser temperature variations. Said coating has a longer service life as compared to a coating applied to the side facing the process space.

It has proven to be beneficial for the quartz glass tubes to have a round cross-section and for the outer diameter of the quartz glass tubes to be in the range of 4 mm to 50 mm.

Quartz glass tubes having a round diameter are easy and inexpensive to manufacture. A quartz glass tube having an outer diameter of less than 4 mm has only a comparatively small hollow space such that the effect of the hollow space on the insulation of the process chamber tends to be lost. A quartz glass tube having an outer diameter of more than 50 mm is difficult to process and has a negative impact on the compact design of the device.

A preferred modification of the device according to the invention provides a heating element 7, which is part of the heating facility 8, to be arranged in at least one of the quartz glass tubes 4_a_-4_d_.

One or more heating elements can be arranged in a quartz glass tube and more than one quartz glass tubes can be fitted with heating elements. Due to the heating element being arranged in a quartz glass tube, the distance between heating element and material to be heated is shorter without a negative effect on the quality of the irradiation intensity.

It has proven beneficial to fit all quartz glass tubes of a wall element with heating elements.

Since all quartz glass tubes of a wall element are fitted with heating elements, it is ensured that the material to be heated can be heated as evenly as possible and at a high irradiation intensity.

It has proven to be beneficial for the heating element 7 to be an infrared radiator comprising a radiator tube and a heating filament.

The result of having a heating element in the form of an infrared radiator is that the material to be heated is heated directly which allows the material to be heated to be heated rapidly and evenly. The infrared radiator used for this purpose can, for example, be designed to emit short-wave, medium-wave and/or long-wave infrared radiation; it comprises at least one heating filament that is surrounded by a radiator tube, for example made of quartz glass.

It has proven beneficial for the quartz glass tube to be the radiator tube of the infrared radiator.

Due to the quartz glass tube of the wall element concurrently being the radiator tube of the infrared radiator, the distance between the heating element and the material to be heated can be made as small as possible. Moreover, the radiation losses at the quartz glass tube and at the radiator tube are thus minimised such that the energy efficiency of the device is improved.

In an advantageous embodiment, the heating element is designed to emit medium-wave infrared radiation.

In contrast to infrared radiators for the range of short-wave IR wavelengths, which are filled with an inert gas to protect the heating filament and are therefore closed, the radiator tube of a medium-wave heating radiator can be open. In a radiator tube that is open on one or both sides, the heating filament is accessible directly and is therefore particularly easy and inexpensive to replace. Said embodiment therefore simplifies the assembly and maintenance of the device.

An advantageous embodiment of the device according to the invention provides the wall elements to form a cuboidal hollow body.

The wall elements are part of the furnace lining. Preferably, the wall elements are arranged appropriately such that they form a cuboidal hollow body. Accordingly, for example, the cuboidal hollow body is surrounded on all sides by wall elements according to the scope of the invention. A hollow body of this type is well-suited for use, in particular, as furnace lining for a furnace used in discontinuous operation. Moreover, the cuboidal hollow body can just as well be designed to be open on one or two sides. A furnace lining that is open on two sides, in particular, is well-suited for use in continuous operation.

A preferred modification provides the cuboidal hollow body to comprise a wall element that forms the floor plate, a wall element that forms the cover plate, and four wall elements that form the side walls of the hollow body.

A furnace lining in the form of a cuboidal hollow body having a floor plate, a cover plate, and four wall elements is well-suited, in particular, as furnace lining for a furnace that is used in discontinuous operation. The wall elements enclose the process space, which renders the furnace lining well-suited for applications with high cleanliness requirements as well. Since the furnace lining is fabricated from quartz glass, no significant contamination from the furnace lining is to be expected under process conditions.

It has proven to be advantageous to have at least two wall elements be connected to each other in a log house manner, in that preferably two wall elements are connected to each other by zinc coating on corners of the body and/or the quartz glass cylinders of a first and a second wall element to alternately project beyond the other at corners of the body.

The wall elements of the furnace lining are connected to each other in a log house manner, for example through zinc coating or interlocking. The wall elements project beyond each other on corners of the body or they end flush at the corners. Due to the connection of the wall elements in a log house manner, a joined connection is obtained that withstands high mechanical loads and concurrently enables the replacement of individual wall elements.

It has proven beneficial to have the projecting wall elements, for fixation thereof, be connected to a furnace shell surrounding the furnace lining.

The furnace shell comprises an insulation, for example in the form of a mineral fibre mat, and a sheet metal jacketing. The projecting wall elements can, for fixation thereof, be loosely or fixedly connected to the furnace shell. In the simplest case, fixation of the wall elements is enabled just by the wall elements being surrounded by the insulation and the sheet metal jacketing.

Another preferred embodiment of the device according to the invention provides the furnace lining to be designed to be cylindrical in shape and to comprise a wall element, which has multiple quartz glass tubes curved like a ring and forms the cylinder jacket surface, a wall element forming the cover plate, and a wall element forming the floor plate.

A hollow cylinder-shaped furnace lining enables even irradiation of the material to be heated on all sides, in particular if the material to be heated also is cylindrical in shape. Moreover, the furnace lining comprises wall elements in the form of a floor plate and a cover plate.

It has proven beneficial for the floor plate and/or the cover plate to comprise multiple quartz glass cylinders that are connected to each other by means of the $SiO_2$-containing connecting mass.

A floor plate and/or cover plate made of quartz glass cylinders is/are easy and inexpensive to manufacture. Moreover, quartz glass cylinders comprise a hollow space that contributes to a thermal insulation of the device. Moreover, multiple heating elements can be arranged in a floor plate and/or a cover plate made of multiple quartz glass cylinders such that an irradiation intensity that is as even as possible with regard to the material to be heated can be attained.

An advantageous refinement provides the furnace lining to be surrounded by a refractory high temperature mat.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

EXEMPLARY EMBODIMENT

Figure 1:
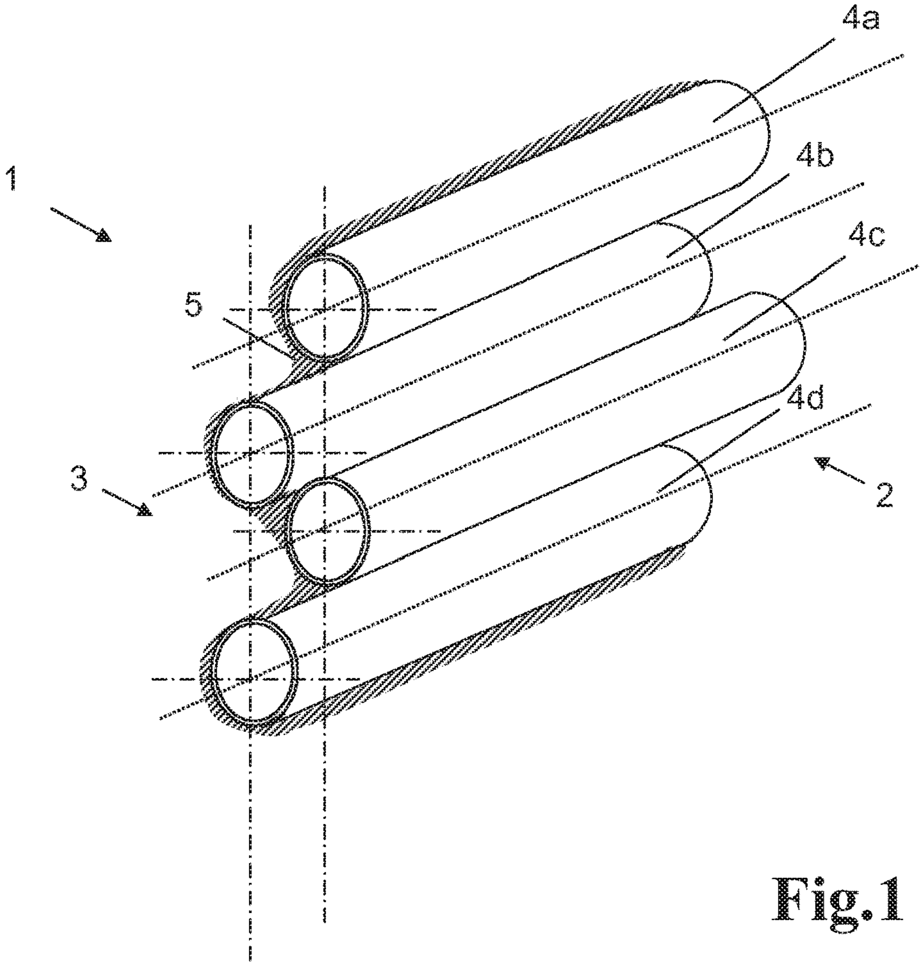
Figure 2:
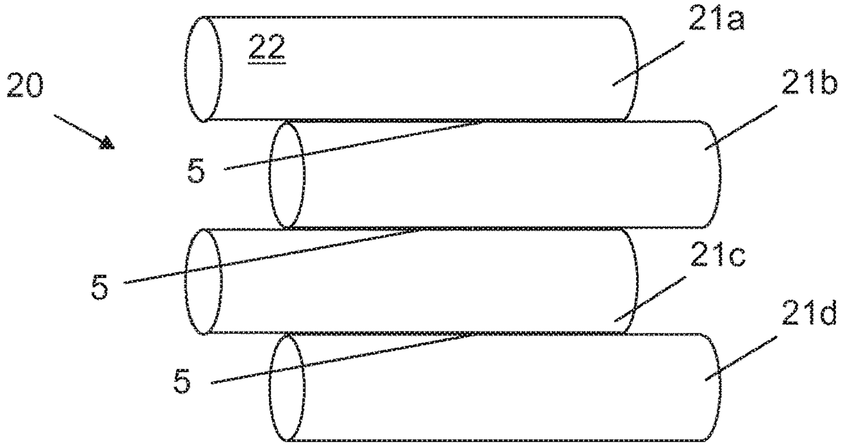
Figure 3:
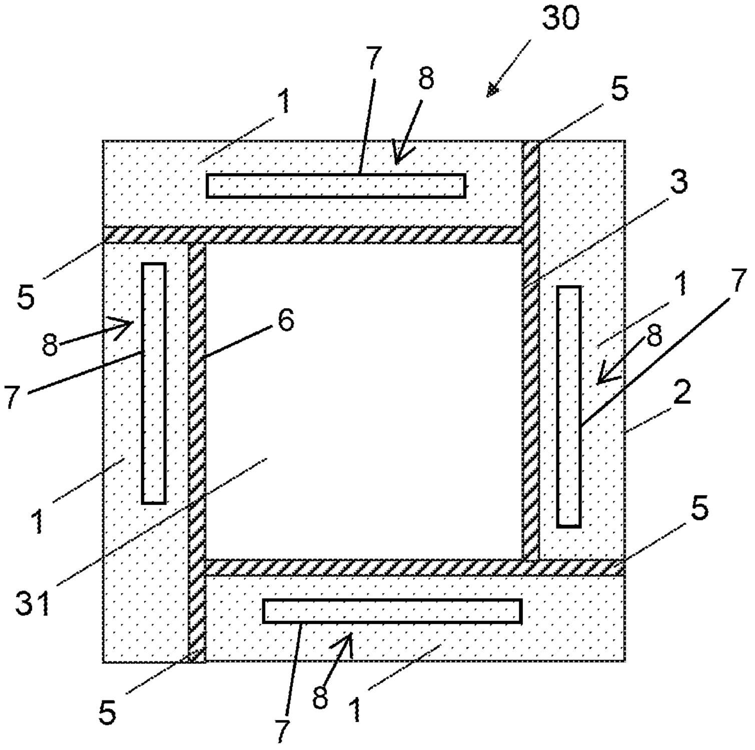
Figure 4:
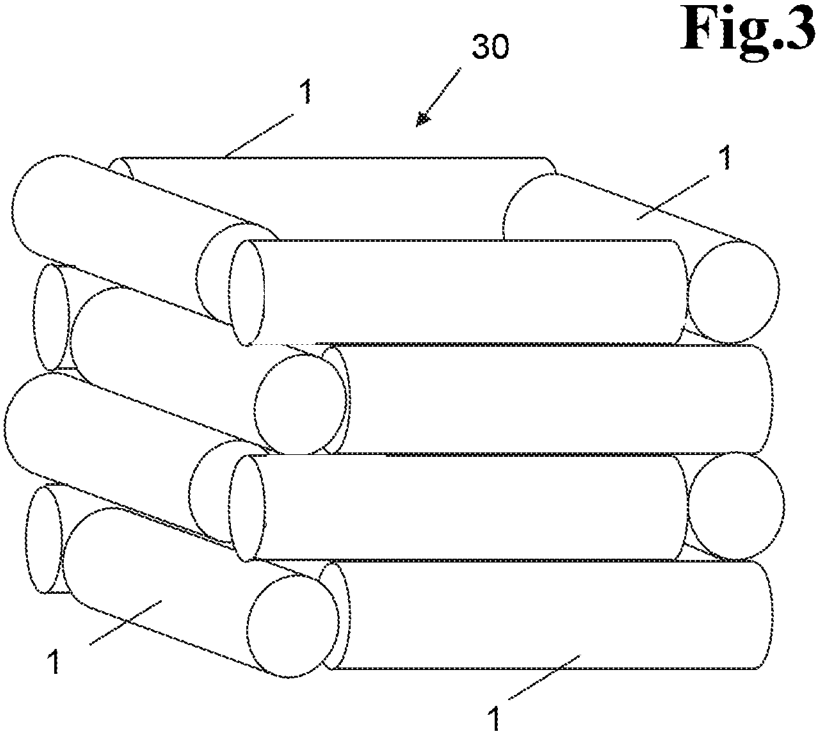
Figure 5:
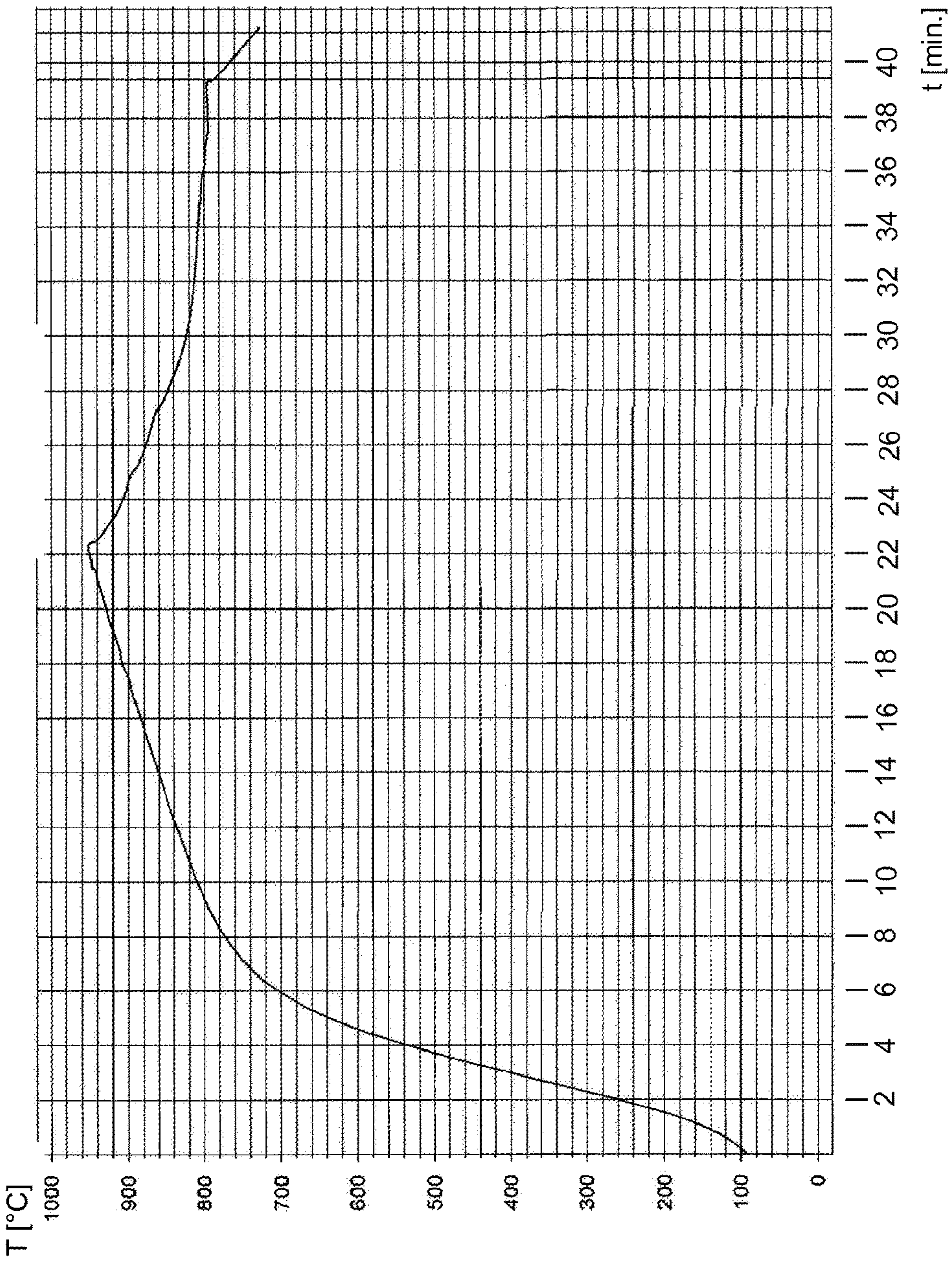

In the following, the invention is illustrated in more detail by means of exemplary embodiments and a drawing. In the figures showing schematic views:

FIG. 1 shows a spatial view of a first embodiment of a wall element of the device for heat treatment according to the invention;

FIG. 2 shows a side view of a second embodiment of a wall element of the device for heat treatment according to the invention;

FIG. 3 shows a top view onto four wall elements according to FIG. 1 that are connected to each other;

FIG. 4 shows a spatial view of four wall elements that are connected to each other; and FIG. 5 a temperature-time course of a sample positioned in the device according to the invention.

DETAILED DESCRIPTION OF THE INVENTION

FIG. 1 shows a schematic view of a wall element of the device for heat treatment according to the invention, which, in toto, has reference number 1 assigned to it. The wall element 1 consists of four quartz glass tubes 4*a*-4*d* made of transparent quartz glass. The dimensions of each quartz glass tube 4*a*-4*d* are length×width×height (L×W×H) 350 mm×34 mm×14 mm. In order to build-up a two-dimensional wall element, the quartz glass tubes 4*a*-4*d* are arranged adjacent to each other and are connected to each other by means of a $SiO_2$-containing connecting mass 5. The quartz glass tubes 4*a*-4*d* are arranged in planar and alternating manner in wall element 1, offset by 50 mm, such that the quartz glass tubes 4*a* and 4*c* on the one hand and the quartz glass tubes 4*b* and 4*d* on the other hand project from the composite. The whole wall element 1 is 140 mm in width and 400 mm in length.

The production of the wall element 1 is illustrated in more detail in the following: For connecting the quartz glass tubes 4*a*-4*d*, a suspension of quartz powder and water is used as $SiO_2$-containing connecting mass 5 to coat one side of each of the four quartz glass tubes 4*a*-4*d* one after the other. The suspension is applied to the surface of the quartz glass tubes 4*a*-4*d* at room temperature using an automated spraying method. The coating is approximately one millimeter in thickness. Prior to drying, the quartz glass tubes 4*a*-4*d*, which are coated on one side, are placed with the coated side up on a temperature-resistant level holder plate made of quartz glass. Right after coating, the quartz glass tubes 4*a*-4*d* are pressed against each other axially such that a successive build-up generates a substance-to-substance level composite in the form of a plate.

The quartz glass tubes 4*a*-4*d*, which are being pressed against each other, are in the fragile green compact state after coating; therefore, they are then transferred to a sintering furnace together with the holder plate. The green compact is then sintered at 1,240° C. for two hours in an air atmosphere. After sintering, the quartz glass tubes 4*a*-4*d* are connected to each other in mechanically stable manner such that a wall element 1 is obtained that consists of more than 99.9% quartz glass ($SiO_2$). The coating in the finished wall element 1 is applied to the side 3 of the wall element 1 facing the process space; it is opaque and also serves as reflector layer 6.

In as far as the same reference numbers are used in FIGS. 1 to 4, these denote components and parts that are identical in design or equivalent as illustrated in more detail above by means of the description of the embodiment of the wall element 1 according to FIG. 1.

A second embodiment of a wall element is shown schematically FIG. 2 depicting a side view of the wall element 20. The wall element 20 comprises four quartz glass cylinders 21*a*, 21*b*, 21*c*, 21*d* that are connected to each other by means of an $SiO_2$-containing connecting mass 5. The quartz glass cylinders are arranged adjacent to each other and are alternately offset by 50 mm with respect to each other. The side 22 as well as the opposite side (not shown) of the wall element 20 are coated with the $SiO_2$-containing connecting mass 5 only in the region where they are connected. The dimensions of the individual quartz glass cylinders 21*a*, 21*b*, 21*c*, 21*d* are as follows: (L×W×H) 350 mm×34 mm×14 mm; the whole wall element 20 is 140 mm in width and 400 mm in length.

Example 1

In the first embodiment, the device for heat treatment (not shown) comprises a furnace lining in the form of a cuboidal hollow body; the furnace lining comprises multiple wall elements 1 made of quartz glass, a floor plate, and a cover plate.

FIG. 3 shows a top view of four wall elements 1 that are stood up vertically and are connected to each other by means of a joined connection. The composite, in toto, has reference number 30 assigned to it. The wall elements 1 are assembled appropriately such that the ends of the wall elements 1, which are alternately offset by 50 mm with respect to each other, are nested inside each other and are connected to each other in a log house design. Each wall element 1 comprise a side 2 facing away from the process space 31 and a side 3 facing the process space 31. The side 3 facing the process space 31 is coated with the $SiO_2$-containing connecting mass 5. A spatial view of the wall elements 1 connected in a log house design is shown in FIG. 4.

The composite 30 is covered by a rectangular cover plate (not shown) consisting of eleven tubes made of quartz glass. The tubes have a length of 400 mm, a width of 34 mm, and a height of 14 mm; they are connected to each other by means of a $SiO_2$-containing connecting mass 5. The connection is effected in the same manner described for wall elements 1 in FIG. 1. The individual tubes of the cover plate are arranged adjacent to each other. Unlike the wall elements 1, the individual tubes of the cover plate are not arranged at an offset with respect to each other. The side of the rectangular cover plate facing the process space is coated with the $SiO_2$-containing connecting mass, whereas the side facing away from the process space is not coated. The dimensions of the rectangular cover plate are as follows: L×W×H 400×400×14 mm. The surface area of the cover is 0.16 $m^2$.

The floor plate (not shown) is also fabricated from round tubes made of quartz glass that are connected to each other by means of the $SiO_2$-containing connecting mass 5. In order to produce the floor plate, ten round tubes with an outer diameter of 10 mm and a length of 400 mm are connected to each other. The round tubes are arranged adjacent to each other in a plane, but with no offset with respect to each other. The width of the floor plate is approximately 100 mm and its surface area is 400 mm×100 $mm^2$=0.04 $m^2$.

A heating wire (filament) with a length of 350 mm is inserted into each of the ten round tubes of the floor plate. The ends of the round tubes are closed by means of a ceramic mount. The electrical power of each filament is 400 watts, the total power is 4 kilowatts (kW). Since the surface area of the heating field of the floor plate is 350×100 $mm^2$ in size, the resulting power per unit area is 4 kW/0.035 $m^2$=114 kW/$m^2$.

The difference in surface area (0.12 $m^2$) between floor plate and ceiling [JT1] plate is covered with tube sections. The tube sections are coated on the top with opaque, highly diffusely reflecting quartz glass. The coating consists of very many small quartz beads with a diameter of approx. 10 nanometers to 50 micrometers. The firmly sintered and correspondingly porous $SiO_2$ material, whose pores are filled with air, has an enormous surface area of approx. 5 $m^2$ per gram of the material due to the tiny structures. In the design described presently, approximately 670 grams of the opaque material are applied such as to be fixed such that the surface area on the inside of the furnace is approximately 3,350 $m^2$. The surface being this large promotes rapid indirect heating of the air in the pores via the direct heating of the quartz glass by the infrared radiation.

The furnace lining is surrounded by a single-layer thermal insulation. The insulation consists of a refractory high temperature mat based on aluminium oxide and silicon oxide and comprises a thickness of 25 mm. The outside of the thermal insulation is surrounded by a sheet metal jacketing. In order to allow the furnace to be loaded from the top, the cover can be opened. Altogether, the irradiation device weighs approx. 10 kg and is well-suited for mobile use.

The material to be heated is introduced into the process space 31 that is surrounded by the furnace lining. The process space 31 has a length of 320 mm, a width of 320 mm, and a height of 145 mm.

FIG. 5 shows the temperature-time profile of a sample that was positioned in the middle of the process space 31 of the device according to the invention. The sample is a round quartz glass tube having an outer diameter of 10 mm and a length of 50 mm. In order to measure the temperature of the sample to be measured, a NiCrNi thermocouple affixed with ceramic adhesive is provided inside the round quartz glass tube. In order to prevent the measuring result from being falsified by the direct radiation from the heating filaments into the inside of the quartz glass tube, the outside of the round quartz glass tube comprises an all-around gold coating. The sample was placed on a quartz glass goods holder situated at a distance of 30 from the heating field.

For determination of the sample temperature, the device was started up at room temperature (so-called cold start) at full electrical power (4 kW). The temperature of the material to be heated reached 260° C. after 2 minutes and 540° C. after 4 minutes. A temperature of 900° C. was reached after approx. 17.5 minutes and the maximal temperature of 950° C. was reached after 22 minutes.

In order not to endanger the quartz glass components, the maximal temperature was limited to 950° C. and the heating phase was terminated once this temperature was reached. If the quartz glass components and the heating wires are operated at less than 1,000° C. in the long-term, the maintenance-free service life can be up to 10,000 operating hours and more.

In order to set a holding temperature of 800° C. subsequently, the electrical power was lowered to and kept at 1.6 kW. Said temperature is well-suited, for example, for the application of directed reflectors onto substrates made of glass, i.e. metallic layers such as, for example gold. Due to the set-up being closed, not only is the radiation energy used, but the convective heat of the heated air thus generated contributes to the total heating. The temperature gradient in the linear range (260 to 560° C.) is approx. 2.3 K/min during the heating phase and the requisite heating times are minimised.

After the heating process and immediately after the electrical power was switched off, the cover of the set-up was taken off and the sample was removed with tongs. The temperature of the sample still exceeds 600° C. at this time. Due to the excellent heat shock resistance of the internal lining of the furnace made of pure quartz glass, no time-consuming cooling phase is needed such that the total process time is reduced by several hours as compared to conventional muffle furnaces, see reference example 1. The sample can be changed instantaneously such that the process can be repeated right away.

Since the novel internal lining of the furnace consists of quartz glass and the material and the radiators withstand temperatures of almost 1,000° C. in the long-term, there is no need to cool the individual components by means of fans or coolant liquids.

Example 2

The design of the device differs from the design of the device from exemplary embodiment 1 in that it eliminates two wall elements 1 situated opposite from each other. The openings are preparations for continuous introduction of the material to be heated. The furnace having the novel internal lining, in the form of the remaining two walls with cover and floor, is loaded in the middle in warm and switched-on condition (electrical power kept at 1.5 kW). The goods holder is situated at a distance of 60 mm from the heating field (floor).

The sample made of quartz glass, as described in exemplary embodiment 1, is heated up from room temperature, initially at a gradient of approx. 9 K/min, and reaches the temperature of 600° C. after only three minutes and a maximal temperature of 740° C. after 14 minutes. The difference to the maximal temperature of 800° C. as in example 1 is related to convective losses due to the two side openings and the somewhat larger distance between the material to be heated and the radiation source.

Example 3

The design of the furnace according to example 3 corresponds to that of the device from example 2. The furnace is operated in warm and switched-on condition (permanent electrical power of 1.5 kW) and used for a continuous sintering process. For this purpose, a component coated on the upper side with gold, for example a quartz glass tube having dimensions of L×W×H=1,000×34×14 mm, is guided appropriately through the furnace to burn-in the coating such that the component moves through the hot process chamber of the furnace at a speed of 200 mm/min and is guided out on the opposite side. The component is moved through the furnace using a holder situated outside the furnace. The tube is moved keeping a distance of 60 mm to the heating field of the floor plate.

Downstream of the furnace, the coating on the tube has a visually homogeneous surface with very good surface adhesion. The adhesion of the gold to the surface was determined using the adhesive tape tear-off test. Said test encompasses applying a commercially available adhesive tape, for example a Scotch adhesive tape made by 3M, onto the gold-coated surface and then tearing the tape off suddenly in one motion. If the adhesive strength of the gold is insufficient, metallic residues will be seen to remain on the adhesive surface of the tape. The metal-coated surface shows no imperfections due to particles or foreign substances, since the novel furnace lining made of $SiO_2$ is free of contamination and works without generating particles.

Reference Example 1

A conventional muffle annealing furnace comprises an installed electrical power of 24 kW, a furnace lining in the form of a brick lining, and a process chamber of the following useful space dimensions: L×W×H=1,000 mm×500 mm×300 mm. A quartz glass tube that was metal-coated on one side and had a length of 300 mm, a width of 34 mm, and a height of 14 mm was introduced into the muffle annealing furnace in order to burn-in the coating, and the temperature-time profile of the sample was determined. The heating curve (not shown) shows a gradient of 6.6 K/min between 700 and 1,000° C.; the furnace temperature is maintained at maximally 1,000° C. After switching off the furnace, it takes 5.5 hours for the temperature to reach 600° C., which is the earliest time the sample can be removed. In order to ensure a long service life for the brick lining (>1 year) without crack formation, the furnace should be opened only below 400° C., since the lining bricks do not possess high heat shock resistance.

Example 4

The design of the device differs from the one in example 1 in that three floor plates arranged next to each other are provided as two-dimensional radiators. Each floor plate comprises 10 round tubes which each are provided with a heating filament with a power of 400 watts. The total electrical power of the device is 12 kW. Ceramic mounts are provided on the ends of the round tubes. The three two-dimensional radiators (floor plates) cover a total surface area of 400×300 $mm^2$=0.12 $m^2$. The difference to the opposite surface of the cover (0.16 $m^2$) is covered with individual tube sections that are coated on one side on their upper surface.

The heating is directed at a steel plate (L×W×H=200 mm×120 mm×0.75 mm), whose surface is slightly oxidised. The shortest distance between plate and two-dimensional radiator is 30 mm. The target temperature of 800° C., starting from room temperature of 20° C., is reached after four minutes. The heating gradient in the linear range is approx. 4.5 K/s.

Reference Example 2

A steel plate according to example 4 having the same dimensions and quality is being heated from one side in a conventional infrared module with nine short-wave radiators. The infrared module has a power per unit area of 100 $kW/m^2$ and a total electrical power of 38 kW. The surface area of the heating field of the infrared module is L×W=700 mm×500 mm. The distance between the heating field and the material to be heated is 120 mm.

The heating gradient is approx. 14 K/s initially and then falls off strongly. The maximal temperature of 640° C. is reached after approx. 2 min. Due to the high convective losses towards all sides and the high reflectivity, the temperature of the steel plate cannot be made higher through heating by means of radiation, it is not feasible to reach the target temperature of 800° C. It is not expedient to have a smaller distance between plate and heating field, since the surroundings including the radiator heat up to a non-permissible degree in this temperature range despite cooling.

Reference Example 3

A steel plate of the same dimensions and identical quality as the one from reference example 2 is being heated from two sides using two conventional infrared modules with short-wave radiators. The power density of each of the infrared modules is 100 $kW/m^2$ and the total electrical power is 75 kW. The surface area of each heating field of the modules is L×W=700 mm×500 mm. The distance between the heating field and the material to be heated is 120 mm.

The heating gradient is approx. 25-30 K/s initially, the maximal temperature of approx. 680° C. is reached after approx. 1.5 minutes, the target temperature of 800° C. is not attainable. Marked heating (production of smoke) of the surroundings is observed from 500° C.

Example 5

In an alternative embodiment, a wall element is designed appropriately such that it works as a heating radiator and simultaneously heats the material to be heated from multiple sides. Five individual twin tubes made of quartz glass and having a length of 875 mm, a width of 34 mm, and a height of 14 mm are bent into the shape of a ring and are then coated on the outside and connected to each other. The inner radius of the process chamber thus obtained is approx. 120 mm. The circular arc is open by a gap (approx. 30 mm) through which the electrical connections for power supply are guided into a zone outside the process space. The five twin tubes are each fitted with two heating coils with a length of 70 cm each; they are assembled perpendicular above each other in direct contact to form a composite. The power of each heating coil is 0.9 kW. The total power of the device is 9 kW. The floor plate and the cover plate consist of joined individual tubes with no heating elements, as described in exemplary embodiment 1.

A steel plate as described in exemplary embodiment 4 or reference examples 2 or 3 is placed vertically in the middle of the chamber. The mean distance between the steel plate and the inner wall is approx. 120 mm. Starting from a starting temperature of approx. 65° C., more than 1,000° C. are reached after approx. 35 seconds at a heating gradient of approx. 30 K/s. For a holding temperature of approx. 800° C., the electrical power is reduced to 1.6 kW.

Example 6

The furnace lining in another embodiment differs from the furnace lining according to exemplary embodiment 1 in that one wall element 1 is removed. As a result, loading of the process space through the open side is favoured and is effected by means of an automatic robot arm. The robot keeps the component to be heated in the hot zone for a defined period of time until the target temperature is reached. Then, the component is placed in a forming tool. Lastly, the next component is heated to the target temperature in the infrared furnace.

A carbon fibre-reinforced plastic material (CFRP), with the thermoplastic material PPS (polyphenylsulfide) in the present case, is heated. The dimensions of the CFRP plate are L×W×H=180 mm×85 mm×4 mm. The distance between the two-dimensional radiators and the plate is 55 mm.

The two-dimensional radiators are switched on and operated at an electrical input of 4 kW. The process space is heated for five minutes initially before the CRFP material is held into the hot zone. The heating gradient in the linear heating range on the side of the CRFP facing away from the radiator is approx. 4.8 K/s. The electrical heating is switched off some 10 seconds after introduction of the material to be heated into the heating zone in order to avoid premature over-heating of the CFRP surface. Due to the internal lining of the furnace, the emission from the walls, supported by warm air (convection) causes the temperature on the inside to keep increasing despite the side being open such that the target temperature of 260° C. is reached on the side facing away from the radiator approx. 85 seconds after introduction of the CFRP. In the subsequent 100 seconds of recording, the temperature increases up to 280° C. at a gradient of approx. 0.2 K/s and the temperature is maintained at this level for the next minute. Due to the homogeneous heating to 260° C., the PPS softens such that the material is easy to form.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device for heat treatment, comprising:

a furnace lining made of quartz glass, surrounding and defining a process space within;

a heating facility; and a reflector;

wherein the furnace lining comprises multiple wall elements having a side facing the process space and a side facing away from the process space, at least one of the wall elements comprising multiple quartz glass tubes connected to each other by means of an $SiO_2$-containing connecting mass; and wherein at least two of the wall elements are connected to each other in a log house manner, whereby a first and a second wall element alternately project beyond the other at a corner of the furnace lining, thereby interlocking the first and second wall elements.

2. The device according to claim 1, wherein the $SiO_2$-containing connecting mass serves both as reflector and as connecting means.

3. The device according to claim 1, wherein the $SiO_2$-containing connecting mass is applied to the side of a wall element facing the process space.

4. The device according to claim 1, wherein the $SiO_2$-containing connecting mass is applied to the side of a wall element facing away from the process space.

5. The device according to claim 1, wherein the quartz glass tubes have a round cross-section and in that the outer diameter of the quartz glass tubes is in the range of 4 mm to 50 mm.

6. The device according to claim 1, wherein a heating element, which is part of the heating facility, is arranged in at least one of the quartz glass tubes.

7. The device according to claim 6, wherein all quartz glass tubes of a wall element are configured with heating elements.

8. The device according to claim 6, wherein the heating element is an infrared radiator comprising a radiator tube and a heating filament.

9. The device according to claim 8, wherein the quartz glass tube is the radiator tube of the infrared radiator.

10. The device according to claim 6, wherein the heating element is designed to emit medium-wave infrared radiation.

11. The device according to claim 1, wherein the wall elements form a cuboidal hollow body.

12. The device according to claim 11, wherein the cuboidal hollow body comprises a wall element that forms a floor plate, a wall element that forms a cover plate, and four wall elements that form side walls of the hollow body.

13. The device according to claim 1, wherein the projecting wall elements, for fixation thereof, are connected to a furnace shell surrounding the furnace lining.

14. The device according to claim 12, wherein the floor plate and/or the cover plate comprise(s) multiple quartz glass cylinders that are connected to each other by means of the $SiO_2$-containing connecting mass.

15. The device according to claim 1, wherein the at least two wall elements are dovetailed on corners of the body.

* * * * *